May 10, 1966
S. R. NOVAK
3,250,127
INLET TUBE CONSTRUCTION FOR USE WITH
VAPOR-RESPONSIVE DETECTORS
Filed March 4, 1964
2 Sheets-Sheet 1
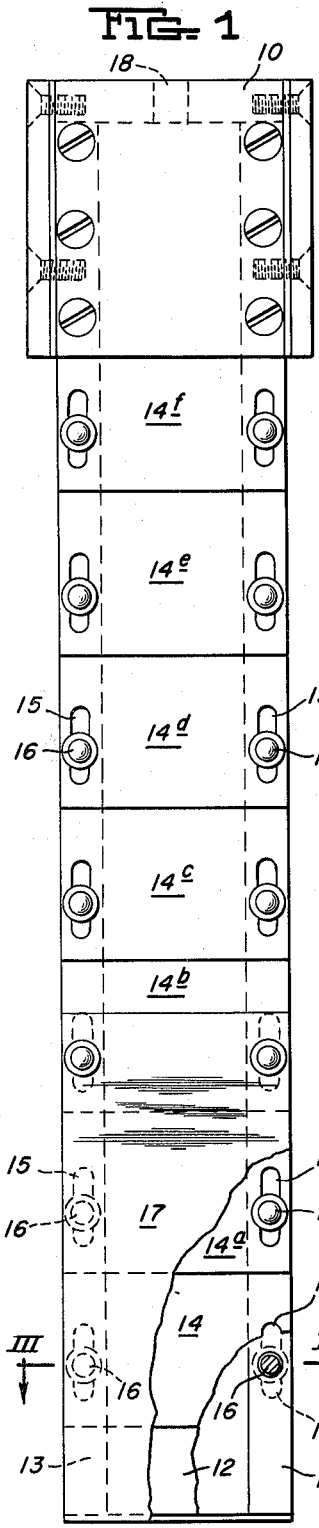
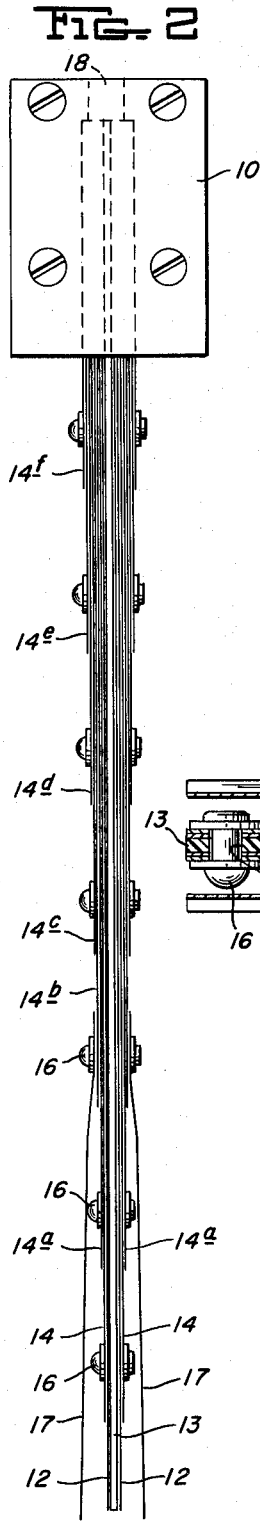
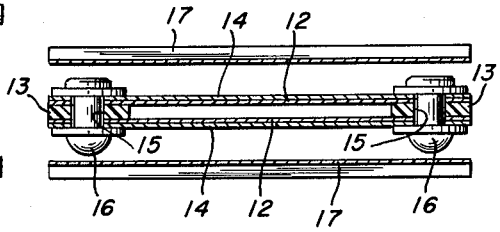
INVENTOR
STEPHEN R. NOVAK
By Donald G. Dalton
Attorney

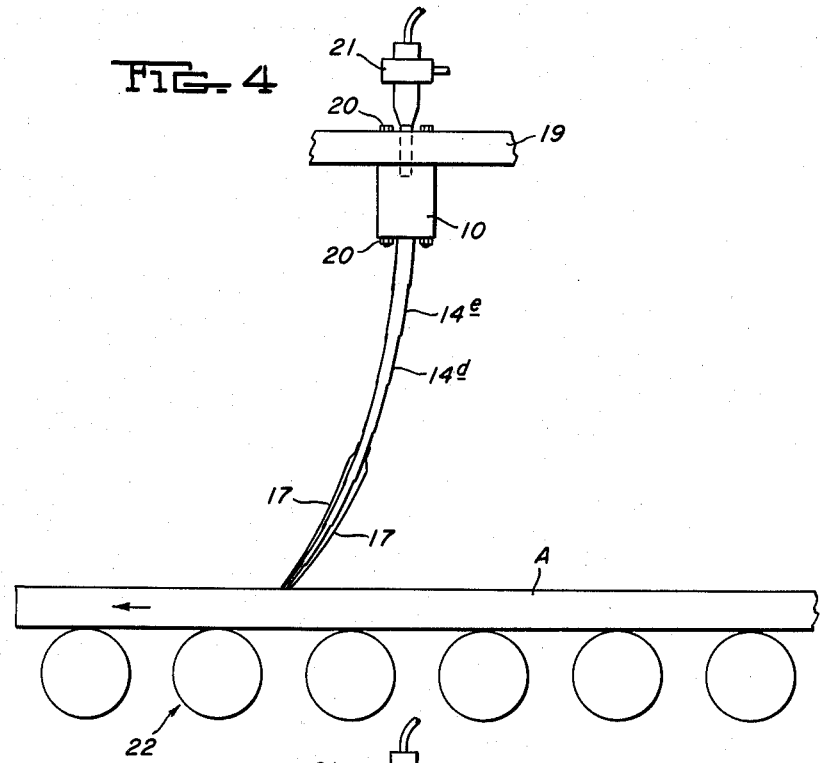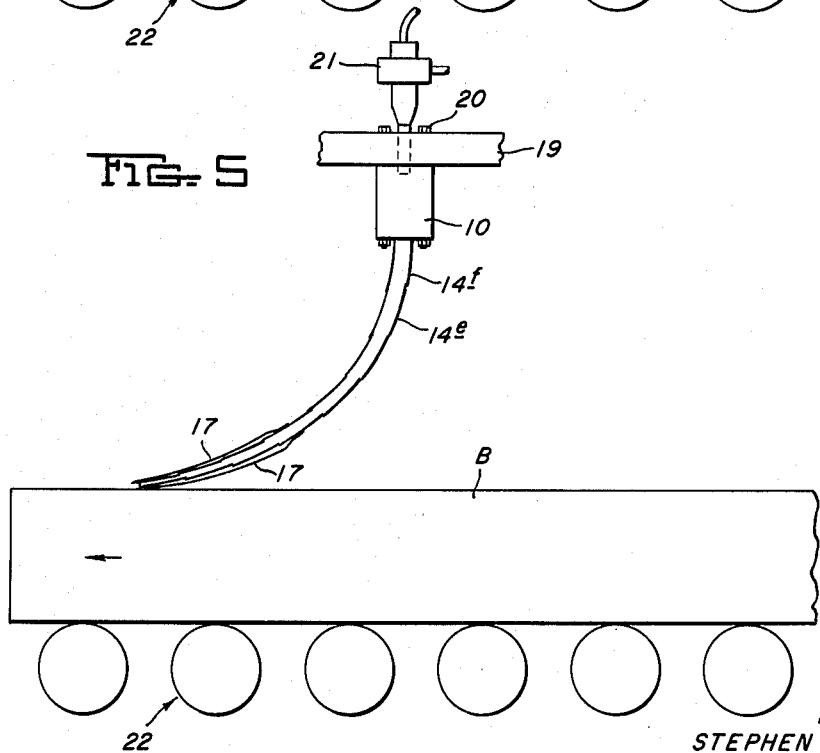

United States Patent Office 3,250,127
Patented May 10, 1966

3,250,127
INLET TUBE CONSTRUCTION FOR USE WITH VAPOR-RESPONSIVE DETECTORS
Stephen R. Novak, Baldwin Boro, Pa., assignor to United States Steel Corporation, a corporation of Delaware
Filed Mar. 4, 1964, Ser. No. 349,440
8 Claims. (Cl. 73—421.5)

This invention relates to an improved inlet tube construction for use with vapor-responsive detectors.

One method of locating flaws in semifinished steel shapes or other metal bodies involves applying to the surface of the body a volatile liquid which flows into surface openings, such as seams, scabs, cracks or the like. The liquid commonly is a halogen-containing organic compound, such as trichloroethane. Excess liquid is removed from the surface, leaving no more than a trace except where the liquid has accumulated in a flaw. The surface then is scanned with detectors to locate areas which continue to give off a relatively high concentration of vapors. Such areas represent flaws, which commonly are removed, as by a scarfing operation. This method of locating flaws forms the subject of a patent application by another inventor, but of common ownership to my application.

The detectors used in this method may be adaptations of commercially available devices intended primarily for locating leaks in apparatus which utilize halogen-containing compounds. For example, a detector of this type is manufactured by General Electric Company and is described in a printed publication by the manufacturer, GE Apparatus Catalog-Meter and Instrument Volume, Section 8240. This detector commonly is used for locating leaks in refrigerators which utilize "Freon," one of several fluorine compounds. The detector includes a platinum anode housed within a tubular cathode. A stream of air, which may contain vapors of the halogen compound, is directed between the anode and cathode, while the anode is heated to a temperature in the approximate range 1400–1600 F. The current transmitted therebetween is proportionate to the concentration of halogen-compound vapors. The detector is calibrated by introducing a known quantity of an air and vapor mixture of known concentration, and adjusting the anode temperature so that the detector gives a correct reading.

One problem encountered in practicing this method is in positioning the inlet of each detector so that it takes in representative samples of vapors as it scans the surface of the metal body. Desirably the inlet passes close to the surface of the body or even contacts the surface to assure that it picks up vapors which originate only from the surface immediately adjacent. Commonly semifinished steel shapes have slivers or sharp edges jutting from their surface, and such shapes are not always of uniform thickness. Consequently, a rigid inlet tube must be located sufficienty far from the surface of the body that there is no interference. Ordinary flexibe tubes would not be satisfactory, since they can bend in any direction and pick up samples from areas out of line with the area they are intended to scan.

An object of my invention is to provide an improved inlet tube which overcomes the foregoing difficultiy, that is, a tube which is flexible only in the direction of relative movement of the detector and metal body, whereby it contacts the surface of the body but remains in the proper location.

A further object is to provide an improved inlet tube which affords the foregoing advantages, yet is of simple construction, bends with a gentle arching without permanent deformation, and snaps back to straightness after it ceases contact with a body.

In the drawing:

FIGURE 1 is a front elevational view of my improved inlet tube;

FIGURE 2 is a side elevational view taken at right angles to FIGURE 1;

FIGURE 3 is a horizontal section on a larger scale on line III—III of FIGURE 1;

FIGURE 4 is a diagrammatic side elevational view showing a relatively thin body in contact with the tube; and FIGURE 5 is a similar view, but showing a thicker body.

As FIGURES 1 to 3 show, my improved inlet tube includes a mounting block 10, a pair of spaced apart leafsprings 12 depending from the block, and a pair of flexible spacers 13 of rubber or plastic between the respective side edges of the springs. I also mount a plurality of reinforcing leaf springs 14, 14a, etc., of graduated length over the outer faces of the leaf springs 12. Preferably the various leaf springs are formed of laminations of two or three individual springs. All the leaf springs 12, 14, 14a, etc., are rigidly fastened at their upper ends within block 10. The springs have respective rows of elongated slots 15 adjacent each edge. Fasteners 16, which can be either bolts or rivets, extend through these slots and through mating openings in spacers 13. Preferably I attach protective leaf springs 17 over the lower portions of the springs 12 and 14 to prevent damage to the fasteners 16 when a body contacts the inlet tube. Block 10 has a vertical opening 18 communicating with the space between the two springs 12.

As FIGURES 4 and 5 show, I mount the blocks 10 of a series of tubes on the underside of a support 19, for example with bolts 20 which pass through openings in the blocks. I mount vapor-responsive detectors 21 over the respective inlet tubes. A conveyor 22 carries a body A or B under the tubes. The body previously has been treated with a volatile liquid, as already explained. Before the body contacts a tube, the tube is straight, as FIGURE 2 shows. When the leading edge of a relatively thin body A contacts the face of the tube adjacent the lower end, the tube bends approximately to the curvature shown in FIGURE 4. When the leading edge of a thicker body B contacts, the curvature is approximately as shown in FIGURE 5. In either instance the tube acts as a nonlinear cantilever beam, and bends with a gentle arching. The slots 15 allow the various springs to slide relative to each other as the tube bends. While the lower end of the tube remains in contact with the body, the reinforcing springs 14, 14a, etc., assure that there is no abrupt bending, such as is likely to cause early failure. After the body has passed, the tube snaps back to straightness. The tube of course bends only in the direction of travel of the body.

While I have shown and described only a single embodiment of my invention, it is apparent that modifications may arise. Therefore, I do not wish to be limited to the disclosure set forth but only by the scope of the appended claims.

I claim:

1. An inlet tube construction comprising a mounting block, a pair of spaced-apart flexible leaf springs fixed to said block and depending therefrom and having free lower ends, a pair of flexible spacers between the respective edges of said springs, and reinforcing means carried by said block and said springs, said springs and reinforcing means bending as a nonlinear cantilever beam in response to forces applied against the outer faces of said springs adjacent their lower ends and snapping back to straightness when the force is removed, said block having an opening communicating with the space between said springs.

2. A tube construction as defined in claim 1 in which said reinforcing means includes a plurality of leaf springs of graduated length overlying the outer faces of said firstnamed springs and of one another.

3. An inlet tube construction comprising a mounting block, a pair of spaced-apart flexible leaf springs fixed to said block and depending therefrom and having free lower ends, a pair of flexible spacers between the respective edges of said springs, a plurality of reinforcing leaf springs of graduated length fixed to said block and overlying the outer faces of said first-named springs and of one another, said springs having rows of elongated slots adjacent their respective edges, and fasteners passing through said slots and said spacers, said block having an opening communicating with the space between said first-named springs.

4. A tube construction as defined in claim 3 in which said springs bend as a nonlinear cantilever beam in response to forces applied against the outer faces of said first-named springs adjacent their lower ends and snap back to straightness when the force is removed, said fasteners and slots enabling individual springs to slide relative to one another during bending.

5. A tube construction as defined in claim 3 including protective springs overlying the lower portions of said first-named springs to prevent damage to said fasteners when forces are applied thereto.

6. The combination, with a vapor-responsive detector, a support on which said detector is mounted, and a conveyor beneath said support for carrying bodies past said detector, of an inlet tube for admitting vapors from the body to said detector, said tube comprising a mounting block fixed to said support under said detector and having an opening communicating therewith, a pair of spaced-apart flexible leaf springs fixed to said block and depending therefrom and having free lower ends spaced above said conveyor, a pair of flexible spacers between the respective edges of said springs, the space between said springs communicating with said opening, and reinforcing means carried by said block and said springs, said springs and reinforcing means bending as a nonlinear cantilever beam when a body traveling on said conveyor applies a force to the outer faces of said springs adjacent their lower ends and snapping back to straightness when the body passes.

7. A combination as defined in claim 6 in which said reinforcing means includes a plurality of leaf springs of graduated length overlying the outer faces of said first named springs and of one another.

8. A combination as defined in claim 7 in which said springs have rows of elongated slots adjacent their respective edges, and including fasteners passing through said slots and spacers, said fasteners and slots enabling individual springs to slide relative to one another during bending.

References Cited by the Examiner

UNITED STATES PATENTS

| | | | |
|---|---|---|---|
| 2,643,680 | 6/1954 | Kaiser | 138—120 |
| 3,067,619 | 12/1962 | Fielding | 73—421.5 |

LOUIS R. PRINCE, *Primary Examiner.*